United States Patent [19] [11] 4,115,078
Janner et al. [45] Sep. 19, 1978

[54] SEPARATION OF GASEOUS MIXTURES OF MATTER

[75] Inventors: Karl Janner, Erlangen; Klaus Gregorius, Neunkirchen am Brand, both of Fed. Rep. of Germany

[73] Assignee: Kraftwerk Union Aktiengesellschaft, Mülheim, Ruhr, Fed. Rep. of Germany

[21] Appl. No.: 579,544

[22] Filed: May 21, 1975

[51] Int. Cl.² .............................................. B03C 3/38
[52] U.S. Cl. ......................................... 55/2; 55/100; 55/101; 204/DIG. 11; 250/251; 250/282; 250/423 P; 331/DIG. 1
[58] Field of Search ........................................ 55/1-3, 55/100, 101; 204/157.1, DIG. 11; 250/251, 282, 423 P; 331/DIG. 1

[56] References Cited
U.S. PATENT DOCUMENTS

| 2,836,750 | 5/1958 | Weimer | 55/2 X |
| 2,959,677 | 11/1960 | Robinson et al. | 250/423 P |
| 3,443,087 | 5/1969 | Robieux et al. | 204/DIG. 11 X |
| 3,484,603 | 12/1969 | Bloom et al. | 250/251 |
| 3,519,356 | 7/1970 | Kroeger et al. | 331/DIG. 1 X |
| 3,532,879 | 10/1970 | Braunstein et al. | 250/251 |
| 3,558,877 | 1/1971 | Pressman | 250/251 |
| 3,710,279 | 1/1973 | Ashkin | 55/2 X |
| 3,740,552 | 6/1973 | Pressman | 204/DIG. 11 X |
| 3,772,519 | 11/1973 | Levy et al. | 204/DIG. 11 X |
| 3,778,612 | 12/1973 | Ashkin | 331/DIG. 1 X |

FOREIGN PATENT DOCUMENTS

| 2,094,967 | 2/1972 | France | 55/2 |
| 1,959,767 | 6/1971 | Fed. Rep. of Germany | 204/DIG. 11 |
| 1,910,574 | 9/1970 | Fed. Rep. of Germany | 55/100 |
| 301,930 | 11/1929 | United Kingdom | 55/3 |

OTHER PUBLICATIONS

Fowles, G. R. Introduction to Modern Optics, Holt, Rinehart and Winston, Inc., New York, 1968, pp. 10, 62, 233-235, 242, 243, 262, 264.
Bennett, C. E., Physics, Barnes and Noble, Inc., New York, 1952, p. 164.

Primary Examiner—Frank W. Lutter
Assistant Examiner—Kathleen J. Prunner
Attorney, Agent, or Firm—Kenyon & Kenyon, Reilly, Carr & Chapin

[57] ABSTRACT

A gaseous jet of a mixture of matter or isotopes to be separated is penetrated by a polarized electromagnetic wave, e.g., a laser or maser beam. The required frequency is in the vicinity of a resonant frequency of a molecular dipole of the substance to be separated. For deflecting the mixture components and therefore, their separation, the forces on the molecular dipoles produced by the electric and/or the magnetic field are utilized.

12 Claims, 9 Drawing Figures

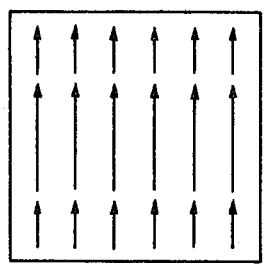
Fig. 4
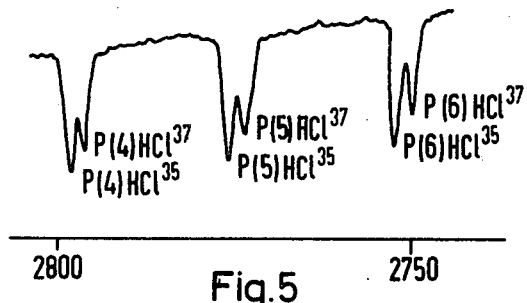
Fig. 5
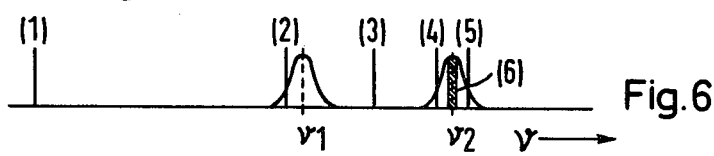
Fig. 6
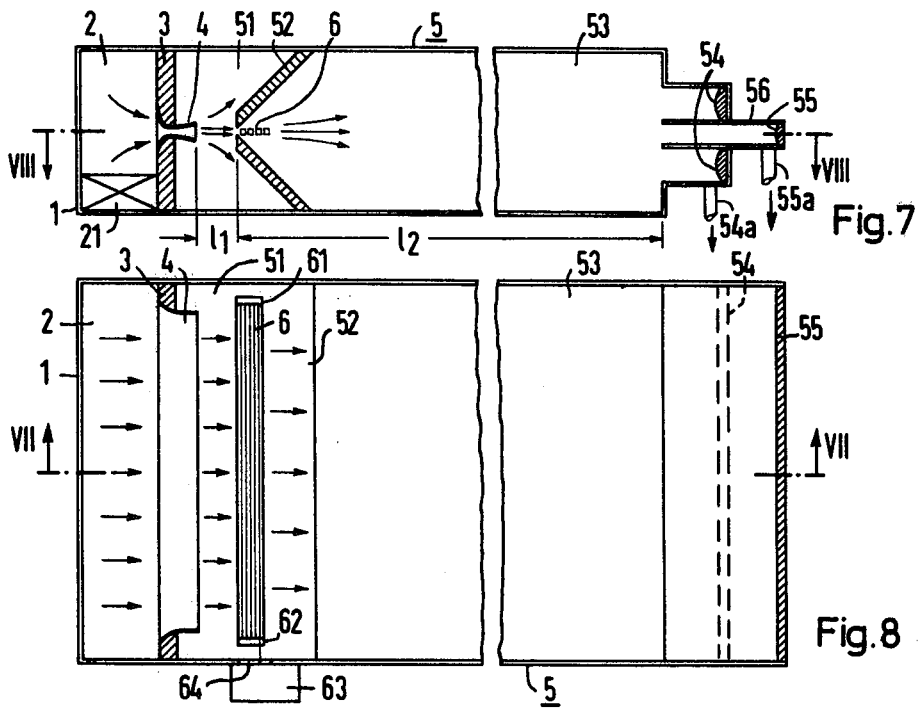
Fig. 7
Fig. 8
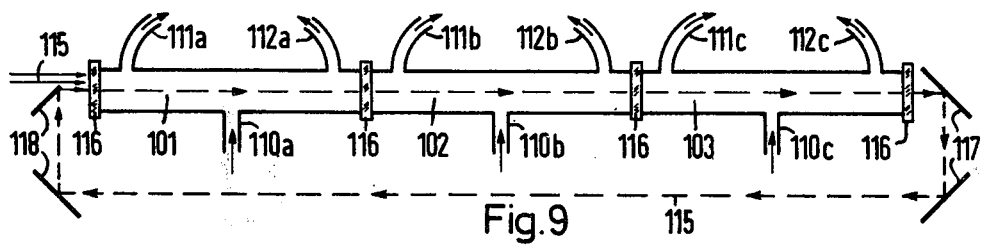
Fig. 9

SEPARATION OF GASEOUS MIXTURES OF MATTER

BACKGROUND OF THE INVENTION

The present invention concerns a method for separating gaseous mixtures of matter or isotopes. The problem of separating mixtures of matter into their individual components occurs frequently in technology. Among this class of problems are, for instance, also the concentration and depletion of individual substances in mixtures of substances, such as, in nuclear technology, the enrichment of fissionable uranium 235, of which only 0.7% is present in the natural isotope mixture of uranium. The methods heretofore applied for this purpose, e.g., gas diffusion installations, are very elaborate and accordingly, also very expensive, particularly because of the very high energy consumption. Other possibilities of reaching this goal are therefore sought. The use of ultracentrifuges is to be viewed in this context also. However, the expense of such apparatus is also very large.

SUMMARY OF THE INVENTION

According to the present invention, a novel solution of the above problem is achieved, largely avoiding the disadvantages of the methods known heretofore, by directing at least one beam of a polarized electromagnetic wave through a gaseous mixture of matter or isotopes and adjusting the frequencies of the electromagnetic waves so that the individual components of the mixture are selectively influenced differently as far as their dipole behavior is concerned and are segregated by the electric and/or magnetic field of the beam.

It is therefore important here that the frequency of the electromagnetic radiation or radiations must be adapted to the kind of substance to be separated. On the other hand, it is then also possible to analyze unknown mixtures of substances qualitatively as well as quantitatively with this method. For this purpose, a radiation source is then required whose frequency can be varied as continuously as possible.

BRIEF DESCRIPTION OF THE DRAWINGS

In the accompanying drawings, the various figures are as follows:

FIG. 4 schematically shows the electric field distribution in a linearly polarized laser beam;

FIG. 5 graphically shows a section from the P-branch of the rotation absorption vibration spectrum of the HCl molecule;

FIG. 6 graphically shows the frequency positions for the cases identified by Table I given hereinbelow;

FIG. 7 schematically in vertical section shows an example of an apparatus embodying the principles of the present invention and is a cross section taken on the line VII—VII in FIG. 8;

FIG. 8 is a horizontal section taken on the line VIII—VIII in FIG. 7; and

FIG. 9 in longitudinal section shows modified apparatus for separating mixtures of matter by laser radiation.

DETAILED DESCRIPTION OF THE INVENTION

This novel method is based on the following physical principles: There are molecules such as, for instance, of light or heavy water, which have a permanent dipole moment. If such molecules are placed in an electric field, these molecular dipoles are aligned accordingly. However, also molecules which because of their symmetrical structure have no dipole moment in field-free space, such as for instance, uranium hexafluoride, are polarized in an electric field due to a small charge displacement caused by the former and acquire an induced dipole moment. This dipole moment corresponds to the product of the electric charge and the distance of the centers of gravity of the charge.

If such molecules are exposed to an aternating electric field, they carry out forced vibrations, i.e., if excited by a sine wave, also the dipole moment oscillates with the same frequency.

Figure 1:
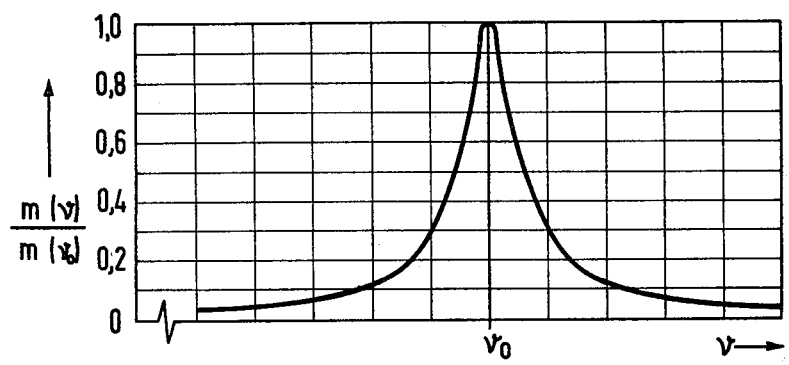
FIG. 1 is a graph illustrating the resonance frequency of a molecule having only one resonance frequency.

In the present case, the alternating electric field emanates from an electromagnetic wave, e.g., a laser beam. Depending on the required wave-length, a maser beam can also be used. In order to obtain the separation effect according to the invention, it is important, in the case of separation by the electric field, that the electric field strength, referred to the cross section of the beam, does not have the same value everywhere, but has a gradient in or against the direction of the field. Thus, the two poles of the molecular dipole are subjected to different field strengths, so that an electric force acts on the molecular dipole. Now, depending on the composition of its matter, such a molecular dipole has definite resonance frequencies. The vibration amplitudes of the molecular dipole are a maximum if the exciting frequency of the electromagnetic wave corresponds to the resonance frequency. This Eigen frequency is very close to the Eigen frequency of the molecule. At higher or lower frequencies, on the other hand, the amplitudes will decrease. This situation is shown in FIG. 1 for the case that the molecule has only one resonance frequency. The frequencies of the electromagnetic oscillation, $\nu$, are plotted along the abscissa, where $\nu_o$ is the resonance frequency of such a molecular dipole. On the ordinate, on the other hand, the amplitude ratio $M(\nu)/m(\nu_o)$ is plotted.

Figure 2:
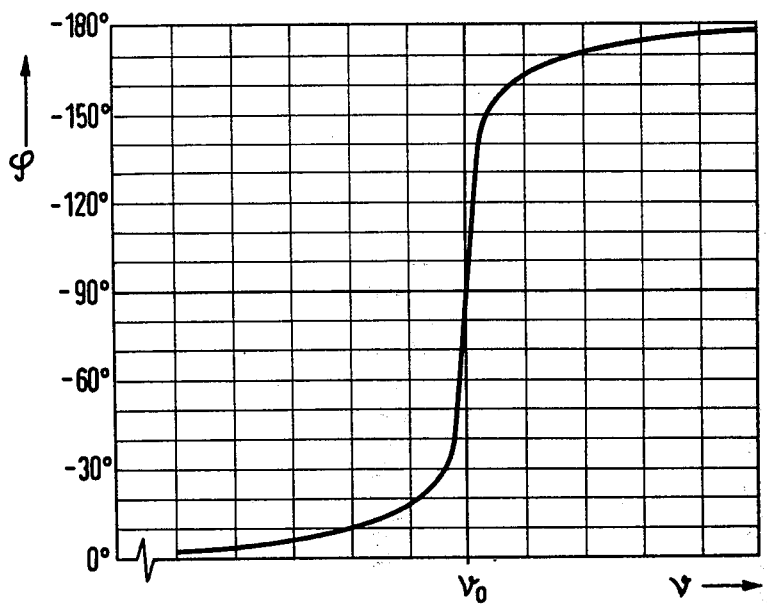
FIG. 2 is a graph showing the phase difference between an exciting alternating field and the vibration of the molecule.

There is a phase difference between the exciting alternating field and the vibration of the molecule, as shown in FIG. 2. As far as the abscissa is concerned, this figure corresponds to the graph in FIG. 1, but the phase difference $\phi$ is plotted along the ordinate. From this, it can be seen that the phase difference between the exciting field and the dipole moment produced approaches 180° if the frequency of the exciting field $\nu$ is slightly higher than the resonance frequency of the molecule. We thus have an almost opposite-phase vibration of the molecule. This phase difference approaches zero if the frequency of the field to be excited, $\nu$, is lower than the resonance frequency. We then have a nearly in-phase vibration.

Figure 3:
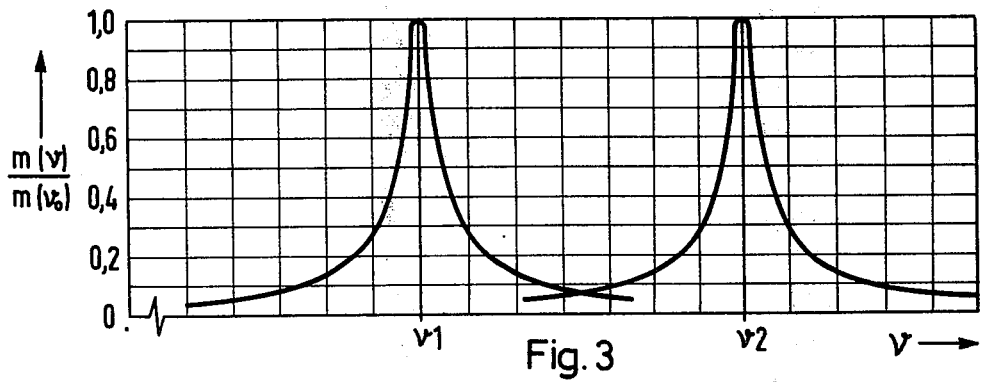
FIG. 3 is a graph showing the resonance frequencies of two kinds of molecules.

The consideration so far was for one kind of molecule. However, if two kinds of molecules with slightly different resonance frequencies $\nu_1$ and $\nu_2$ are present in the exciting field, see FIG. 3, e.g., with isotopes, and if the exciting frequency $\nu$ is between these two, then the kind of molcules 1 vibrates nearly in phase and the kind of molecules 2 nearly in opposite phase relative to the exciting field. This means also that the two kinds of molecules are deflected in an inhomogeneous exciting field in opposite directions.

The distribution of the electric field, e.g., in a linearly polarized laser beam, is schematically shown in FIG. 4 for one point in time. This distribution is called the $TEM_{oo}$ mode. The field has only one direction and its intensity decreases, in or against the direction of the field, according to a function which can be influenced by the design of the radiation source, i.e., for instance, the laser. In the upper half-plane, dipoles vibrating in-phase are deflected downward, and those vibrating in the opposite phase, upward; in the lower half, the direction of the deflection is the reverse, because of the opposite gradient of the electric field. If all similar molecules are to be deflected only in one direction, then only one half-plane is utilized for one beam passage or an asymmetrical field distribution must be generated, where the gas jet passes only through regions without reversal of the field direction and the component of the gradient falling in the direction of the field.

If the exciting frequency of the electromagnetic wave is higher or lower than the two resonance frequencies $v_1$ and $v_2$, then the two kinds of molecules have only a small mutual phase shift and are deflected in the same direction. Their amplitudes, i.e., the absolute values of the dipole moments and therefore, the deflecting force, however, are considerably different, if the exciting frequency is in the vicinity of a resonance frequency. In the latter case, there then exists also a different deflection of the different kinds of molecules and therefore, a possibility of separating them.

To illustrate these relations further, reference is made to Table I, in which the deflection conditions of the molecules M1 and M2 in a linearly polarized laser beam with the $TEM_{oo}$ mode are shown. The frequency positions for the cases 1 to 6 are graphically illustrated in FIG. 6.

It follows from what has been said that the strongest deflection effect occurs if the amplitude difference is large and the deflection direction different.

These deflection phenomena can be utilized for separating the molecules if the molecules are passed, for instance, as a molecular jet or beam through the electromagnetic wave. The deflection of the individual molecular dipoles then effects for them a specific change of direction in the molecular beam. Through collector zones distributed in space accordingly, the separated components of the molecular beam, which were originally intimately mixed, can then be intercepted separately. For the sake of completeness it should further be pointed out that the divergence of the electromagnetic wave can be decreased by adjusting the density distribution within the gas jet and/or the choice of the frequency of the electromagnetic wave regarding its position relative to the resonance frequency. The reason for this is that the density of the gas in the gas jet zone influences the index of refraction of the gas jet. Since refraction is also dependent on frequency, adjustment of density or of frequency will influence the refraction or divergence of the electromagnetic wave. An example of an embodiment of apparatus for carrying out this separation will be described later.

Besides these electric forces, magnetic forces can also be used for separating different kinds of molecules. This follows from the fact that vibrating electric charges of the polarized molecules constitute an a-c current whose carrier is subjected to a deflection force in the alternating magnetic field in accordance with the law of induction. The force vector then runs parallel to the direction (or counter-direction) of the electromagnetic wave, i.e., for instance, the laser beam. It is important here that the dipole moment of the molecules to be deflected, for a normally progressing wave of the field strength, lags by an angle of preferably $45° \leq \phi \leq 135°$, i.e., is shifted in phase.

To exploit the magnetic forces obtained in this manner it is sufficient to irradiate a relatively slow gas flow

TABLE I

Deflection of the Molecules $M_1$ and $M_2$ in a Linearly Polarized Laser Beam with the $TEM_{oo}$ Mode

| Case FIG. 6 | Frequency position | Phase shift lagging | Amplitude ratio of dipole moments | Laser Beam, utilized cross section, FIG. 4 | Direction + = same sense, with field direction − = opposite sense to field direction | Deflection Magnitude |
|---|---|---|---|---|---|---|
| 1 | $v << v_1$ | $\phi_1 \approx 0$ | $\approx 1$ | | | $\approx 0$ |
|   | $v << v_2$ | $\phi_2 \approx 0$ | | | | |
| 2 | $v <^* v_1$ | $\phi_1 < 90°$ | $>> 1$ | entirely | $M_1$ upper half lower half | $\mp$ strongly |
|   | $v << v_2$ | $\phi_2 \approx 0$ | | | $M_2$ upper half | $\mp 0$ |
| 3 | $v_1 < v < v_2$ | $\phi_1 > 90°$ $<180°$ | $\approx 1$ | upper half | $M_1$ | + medium |
|   |   | $\phi_2 < 90°$ | | | $M_2$ | − medium |
| 4 | $v_1 <<v <^* v_2$ | $\phi_1 \approx 180°$ | $<<1$ | upper half | $M_1$ | + 0 |
|   |   | $\phi_2 < 90°$ | | | $M_2$ | + strongly |
| 5 | $v_1 << v$ $v_2 <^* v$ | $\phi_1 \approx 180°$ $\phi_2 > 90°$ $<180°$ | $<<1$ | upper half | $M_1$ | + 0 |
|   |   | | | | $M_2$ | + strongly |
| 6 | $v_1 << v$ $v = v_2$ band width $\Delta v$ finite | $\Delta v \to 0 \begin{cases} \phi_1 \approx 180° \\ \phi_2 = 90° \\ \phi_2 = 90° \pm \Delta\phi \end{cases}$ | $<<1$ | entirely | $M_1$ upper half lower half $M_2$ $M_2$ | $\pm 0$ − 0 0 0 $\pm$ medium |

*means slightly lower than by an electromagnetic wave. Apparatus for utilizing these phenomena for the separation of kinds of molecules will likewise be described later through an embodiment example. In the case of a standing wave, however, (this can be produced by a reflection, as is well known), forces without reversal of direction are produced, under the same frequency relationships, only within the ranges of λ/4 which are characterized by the maxima and minima of the electric and magnetic field strength.

In utilizing the magnetic field of the beam for separating the component it is possible to operate in a mode where the beam's electric and magnetic fields oscillate substantially in phase and in which the frequency of the beam is substantially the same as the resonance frequency of one of the components of the mixture. As an alternative, a frequency which differs from the resonance frequency of one of the components of the mixture to a degree causing the vector of the molecular dipole moment of that component to be shifted in phase from 0° to −60° or −120° to −180° relative to the beam's electric field is also possible.

With the aid of FIGS. 7 to 9, apparatus for implementing the separating methods will be explained, which up to now have been discussed only theoretically. FIGS. 7 and 8 show a facility for separating different molecules by the electric field in a vertical and a horizontal cross section. These molecules are initially present in a mixture of matter which may consist, for instance, of a chemically uniform substance which, however, has different isotopes.

The separating apparatus consists of a flat box 1 which can be evacuated and which is subdivided by a thermally insulating wall 3 into a supply chamber 2 for the mixture 21 of matter and an evacuated chamber 5. Both spaces are connected with each other via an elongated Venturi tube 4 and the chamber 5 is then divided again by an orifice 52 into two parts 51 and 53. This orifice functions to limit the gas stream coming out of the nozzle at its edges in such a way that it continues as straight as possible and has very little divergence left. Immediately after the orifice 52 a bundle of laser beams 6 passes through the flat gas jet. The vector of the electric field of the linearly polarized laser beam has a vertical orientation. The laser beam generated in the radiation source 63 enters the reaction chamber 53 through the window 64. Provision is made through mirror arrangements 61 and 62 that the beam goes back and forth several times and passes through the molecular gas stream in the process. As illustrated in FIGS. 7 and 8, the beam passes through the stream essentially perpendicular thereto.

The rear wall of the chamber 1 is designed as a collection zone 54 and 55, on which the different parts of the mixture of substances, deflected by the electric field of the laser beam, precipitate. They can be condensed there, for instance, by additional cooling devices, not shown, or also suctioned off in a manner known per se, and recovered in cooling traps.

The mixture of matter 21 contained in the supply chamber is here chosen so that it has a fairly high vapor pressure of, say, one bar at temperatures as low as possible. This gas of the mixture of matter then flows out through the Venturi tube 4, attains a very high velocity while being cooled down and has the shape of a gas jet whose vertical width is enlarged only little. The lowering of the temperature is important so that the gas jet does not diverge too much due to the thermal motion of the individual particles. However, since this state is not reached 100 percent, the orifice 52 has the purpose to peel off the diverging components of the gas jet at the top and bottom. These particles remain in the chamber 51 and are recovered by cooling or pumping off, similarly to the particles that reach the collection zones 54 and 55. As shown in the figure, the one and/or the other kind of molecules is deflected here from the gas jet perpendicularly to the direction of propagation. The length of the deflection chamber 53 is obtained here from the velocity gain caused by the deflection force within the electromagnetic radiation zone perpendicularly to the direction of the gas jet, as well as the velocity of the residual divergence and the cross section of the undeflected gas jet. The separation effect can therefore be utilized properly only if a sufficient physical distance of the different striking zones 54 and 55 is provided. It may be advantageous here to separate these two zones additionally from each other by walls 56 extending in the direction of the jet.

As an example for the order of magnitude of this apparatus, it may be mentioned that the thickness of the beam leaving the Venturi tube 4 is about $1.2 \times 10^{-2}$ cm, the distance between the Venturi tube and the orifice about 1 cm and the length of the deflection chamber 53, about 100 cm. The width of the gas jet depends here on the quantity of material to be put through.

For separating the uranium isotopes U 235 and U 238 in the form of uranium hexafluoride, for instance, the following relationships may then be expected or must be set: The temperature in the supply chamber is 329° K., so that a pressure of 1 bar adjusts itself. In the chamber 51 the pressure should be less than $10^{-6}$ bar and in the deflection chamber 53, less than $10^{-8}$ bar, so that the mean free path of the individual particles is longer than the actual flight distances available for the same. This can be accomplished simply by cooling a part of these chambers to temperatures of 197° K., or 178° K. for the deflection chamber 53. The frequency of the laser radiation is $1.9 \times 10^{13}$ sec$^{-1}$ and the laser beam power density is about $3 \times 10^7$ W/cm$^2$. With a gas jet 1 m wide, a narrowest gap width of the Venturi tube of 0.025 mm and 10% utilization of the nozzle jet, one obtains a mass throughout of about 1.5 g per second. If the laser beam is run through the mirror arrangement 61/62 about 20 times, one can expect almost complete separation. It is advantageous to use a radiation source whose frequency is adjustable, so that the laser beam frequency can be adjusted optimally for separation effect and absorption losses of the laser beam.

The selection of suitable excitation frequencies will be illustrated by the example of the HCl molecule (with permanent dipoles) for separating the chlorine isotopes Cl 37 and Cl 35. FIG. 5 shows a section from the P-branch of the rotation absorption vibration spectrum after S. Mizushima et al: "A Report on the Perkin-Elmer Grating Spectrometer Model 112 G"; Perkin-Elmer Corporation, 1959. Suitable frequencies are situated at the base of the lines and in the depression between the closely adjacent maxima, i.e., at the wave numbers 2800 cm$^{-1}$, 2797 cm$^{-1}$, and 2795 cm$^{-1}$.

As a further example will be cited the separation of boron 10 and boron 11. The compound $BF_3$, for instance, can be considered for this purpose. The suitable frequencies for boron 10, expressed in wave numbers $\bar{v}$, ($\bar{v}$ = frequency/light velocity) are at 1505 cm$^{-1}$ and 482 cm$^{-1}$, and for the isotope boron 11 at 1454 cm$^{-1}$ and 480 cm$^{-1}$.

Examples of molecules without permanent dipole moment are the hexafluorides $UF_6$, $WF_6$, $NpF_6$ and $PuF_6$. For these, only frequencies are suitable which are close to the resonance vibrations where a dipole moment is induced, such as those fundamental oscillations which are designated as $\nu_3$ and $\nu_4$, respectively, in the literature (e.g., Kasuo Nakamoto, "Infrared Spectra of Inorganic and Coordination Compounds", John Wiley and Sons Inc., 1970) and combination-or harmonic oscillations, in which $\nu_3$ and $\nu_4$ participate.

The wave numbers of interest for the fluorides mentioned are listed in the following in tabular form:

TABLE II

|  | $UF_6$ | $NpF_6$ | $PuF_6$ | $WF_6$ |
|---|---|---|---|---|
| $\nu_3$ | 619.4 P | | | |
| | 624.4 Q | | | 712 |
| | 629.8 R | | | |
| $\nu_4$ | 179.0 P | 193.0 P | 201.1 P | |
| | 186.2 Q | 198.6 Q | 206.0 Q | |
| | 190.6 R | 202.7 R | 211.0 R | |

Preferably, a frequency of the band flank or edge is chosen.

The separating apparatus shown schematically in FIGS. 7 and 8 can, of course, also be greatly modified designwise, for instance, with respect to the volume of the individual chambers, the design of the orifice, the collection zone, etc.

FIG. 9 shows schematically an arrangement for separating mixtures of matter by means of the magnetic component of an electromagnetic wave, in this case, laser radiation. The apparatus consists of a thin tube with the sections 101, 102, 103, which are separated from each other by the radiation-permeable walls 116. Each of these individual sections is provided with an inlet 110a, b and c for the gaseous mixture of matter and as outlets for the mixture components segregated in these sections 101, 102 and 103, the exhaust nozzles 111a, b and c, as well as 112a, b and c, are provided. The laser beam 115 enters the apparatus from the left in this illustration, is deflected at the right by a mirror system 117 and re-enters the apparatus on the left side via the mirror system 118. For this purpose these mirror systems 117/118 are designed so that the parallel laser beams largely fill the cross section of the separation chambers (101, 102, 103 etc.). The individual sections of this apparatus can be operated here by themselves in parallel, but it is also possible to connect them in series in cascade-fashion, which would contribute to an increase of the separation effect.

The diameter of the separating chambers 101, 102, 103, etc., depends on the laser beam diameter, at which the required power density of about $10^7$ W/cm$^2$ is reached. It is about $1.5 \times 10^{-2}$ cm, for instance, for a laser power of 3 kW. The length of these individual separating chambers is in this case about 7 mm. With an entrance pressure of 1 bar and a flow velocity of 9 m/s (laminar flow), the throughput through a separating chamber is about $2 \times 10^{-3}$ g/sec. With parallel operation of 100 of these small cells, one obtains in continuous operation a throughput of 6 tons per year. As materials for the chambers are considered, for instance, aluminum, nickel, "Teflon", and for the windows, barium fluoride, for a throughput of $UF_6$.

This novel separating method with electric and/or magnetic fields can not only be used for separating mixture components, but it also provides the possibility to identify the individual or single components of unknown mixtures. Complementing the already described deflection arrangement, essentially only a variable radiation source is required for this purpose, or several radiation sources whose frequency ranges supplement each other. To investigate such unknown mixtures, the radiated incident frequency is then varied until a separation effect occurs. Already the frequency used here provides a hint as to the separated substance, but in addition, the latter can now be further examined by chemical or physical means. It may be advantageous here to combine the apparatus required for the identification of the separated matter with the separating apparatus itself.

If one generates instead of the wide gas jet in the arrangement according to FIGS. 7 and 8, a gas jet which is narrow in both dimensions of the cross section (by forming the nozzle and the orifice accordingly) and which has very little divergence, then also the deflection due to the magnetic field of the light wave can be detected, besides the deflection due to the electric field. In this manner, the deflection of the gas jet furnishes as a function of the frequency of the laser beam, a measure for the induced dipole moment and its phase with respect to the electric and magnetic field of the light wave. This permits conclusions as to the structure of the molecules to be drawn.

Referring back to the apparatus shown by FIGS. 7 and 8, it is to be understood that the separated matter or isotopes are withdrawn from the zones indicated at 54 and 55 respectively, by suction pipes 54a and 55a, respectively, which can also serve to evacuate the separation chamber 53.

In FIG. 9, as to each of the series of chambers, the separated isotopes or other components of the gaseous mixture are separately withdrawn through the suction pipes 111 and 112 a through c, and by controlling the differential pressures between them and the inlet pipes 110 a through c, the described low pressure can be maintained in each of the series of chambers involved. That is to say the particles entering through the inlets 110a, 110b and 110c will be deflected differently and separated so that, for example, different isotopes will be drawn out through the outlet 111a, and 112a, 111b and 112b, and 111c and 112c. As is evident the initial direction of the particles on entry is transverse to the beam which is directed essentially along the axis of the tube.

What is claimed is:

1. A method for physically separating components of a gaseous mixture, said gaseous mixture containing at least two components having different resonance frequencies comprising the steps of:
   a. establishing a gas stream containing said gaseous mixture with said components;
   b. passing at least one inhomogeneous polarized electromagnetic beam having a gradient in its polarized direction through said stream essentially perpendicular thereto, said beam having a frequency which causes said at least two different components to be excited with respect to their dipole behavior in different manners to result in the generation of a deflecting force perpendicular to a plane containing said gas stream and said electromagnetic beam which deflection will be different for the at least two components; and
   c. collecting said components after the deflection thereof.

2. The method of claim 1 in which to separate the components by the magnetic field of said beam the beam's electric and magnetic fields oscillate substantially in phase and its frequency is substantially the same as the resonance frequency of one of the components of said mixture.

3. The method of claim 1 in which said beam is radiated by a laser or maser.

4. The method of claim 1 and further including the step of reflecting said beam so that it passes back and forth through said mixture a plurality of times.

5. The method of claim 1 wherein of said step of forming a gas stream comprises forming a sharply focused jet.

6. The method of claim 5 and further including the step of reducing the divergence of said beam due to its frequency dependent index of refraction by adjusting the density distribution within said jet.

7. The method according to claim 1 and further including the step of reducing the divergence of said beam resulting from its frequency dependent index of refraction by adjusting the frequency of said beam relative to the molecular resonance frequency of one of said components.

8. A method for physically separating components of a gaseous mixture, said mixture containing at least two components having different resonance frequencies comprising the steps of:

a. establishing a flow of said gaseous mixture by creating a differential pressure in an elongated chamber having a central axis, the chamber having an inlet and a pair of spaced outlets on opposite sides thereof, said inlet opening into said chamber essentially transversely to the axis thereof;

b. passing at least one polarized electromagnetic wave beam, having electric and magnetic fields oscillating substantially in phase as in a normally progressing wave, through the mixture with the phase of the dipole moment of the molecules of the components of the mixture to be deflected being shifted by said beam so that said dipole moment lags by an angle approximately between the limits of 45° and 135°, in the direction of the axis of the elongated chamber, said beam having a frequency which causes the at least two components of said mixture to be differentially influenced in regard to their dipole behavior whereby said beam will act thereupon to cause deflection of the components of the mixture in different directions; and c. collecting said components after deflection.

9. The method according to claim 8 in which the frequency of said beam differs from the resonance frequency of one of the components of said mixture to a degree causing the vector of the molecular dipole moment of that component to be shifted in phase relative to the beam's electric field by an amount which deviates no more than 60° from the vector of the electric field so as to fall within one of the ranges 0° to −60° or −120° to −180°.

10. The method according to claim 8 wherein said beam is radiated by one of a laser or a maser.

11. The method according to claim 8 and further including the step of reflecting said beam so that it passes back and forth through said mixture a plurality of times.

12. The method according to claim 8 and further including the step of reflecting said beam so as to pass through said mixture in only the same direction a plurality of times.

* * * * *